United States Patent [19]
Schick et al.

[11] 3,884,128
[45] May 20, 1975

[54] COMBINATION CENTERING BEARING AND STOP FOR CAR LIFT PISTONS

[75] Inventors: Frederick A. Schick; Milton H. Brown, both of Springfield, Ill.

[73] Assignee: Dura Corporation, Springfield, Ill.

[22] Filed: July 6, 1972

[21] Appl. No.: 269,390

[52] U.S. Cl. .................................. 92/168; 308/4 R
[51] Int. Cl. ............................................. F16j 15/18
[58] Field of Search ....... 92/203, 260, 168, 77, 165; 308/4 R, 66, 69; 285/421

[56] References Cited
UNITED STATES PATENTS

| | | | |
|---|---|---|---|
| 77,265 | 4/1868 | Evril | 308/69 |
| 1,281,412 | 10/1918 | Parsons | 92/168 |
| 1,358,825 | 11/1920 | Busby | 92/203 |
| 2,023,513 | 12/1935 | Brubaker | 92/203 |
| 2,802,457 | 9/1957 | Thompson | 92/168 |
| 3,141,390 | 7/1964 | McAlpine | 308/4 R |

Primary Examiner—Charles J. Myhre
Assistant Examiner—R. H. Lazarus
Attorney, Agent, or Firm—Hill, Cross, Simpson, Van Santen, Steadman, Chiara & Simpson

[57] ABSTRACT

A bearing assembly for maintaining a piston centered in a cylinder of substantial differential diameter is especially suitable for car lifts. A combination bearing member and stop has a bearing surface guidingly engageable with the piston and is equipped to be connected in fixed axial position in the cylinder. Centering take-up wedging means are provided in the form of wedge segments having wedging cam surfaces complementary to cam surfaces on the bearing member to enable driving the segments into centering take-up relation to and between the bearing member and the cylinder.

12 Claims, 4 Drawing Figures

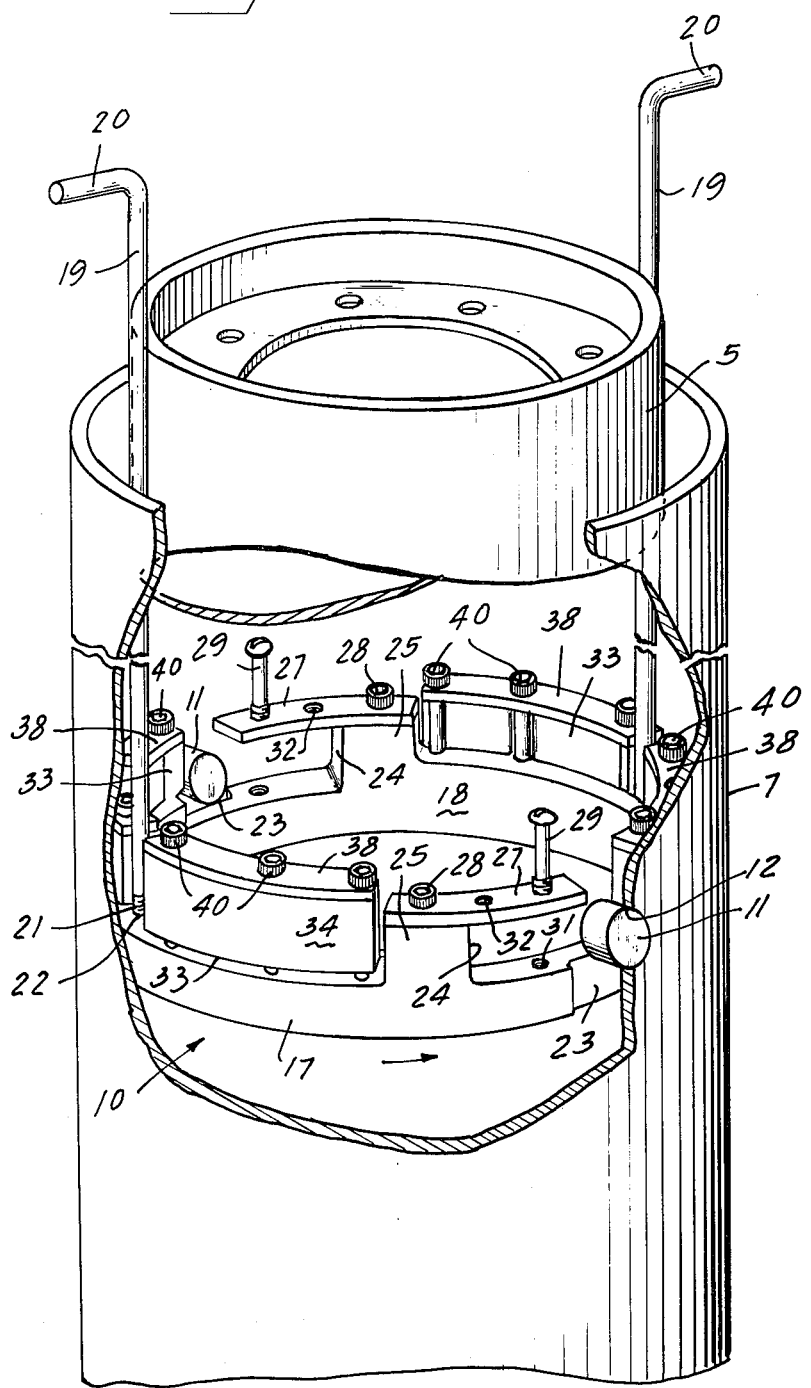

COMBINATION CENTERING BEARING AND STOP FOR CAR LIFT PISTONS

This invention relates to centering bearing assemblies, and is more particularly concerned with such assemblies especially useful in maintaining car lift piston bearings centered and tight in their cylinders.

A special problem is encountered in certain differential piston and cylinder situations, such as in car lifts where although the piston perimeter is machined to close tolerances for sliding in the bearing which is mounted near the top of the vertical cylinder, it is not practical to machine the inside surface of the cylinder to avoid the inevitable manufacturing tolerances, especially in the grade of cylinder tubing economically feasible for this purpose. For example, standard mill tolerance for tubing of the type suitable for this purpose may vary as much as 2/10 inch on the inside diameter. When it is considered that projection of a car lift piston may be about five feet above ground level even as small as a 2/10 inch variance will be greatly magnified in lateral movement or deflection of the top of the extended column from the vertical center line of the cylinder. It is to the alleviation of this problem that the present invention has been especially directed.

It is accordingly an important object of the present invention to provide a new and improved bearing assembly especially adapted for maintaining a piston centered in a cylinder of differential diameter.

Another object of the invention is to provide a new and improved combination bearing and stop assembly especially useful in car lifts of the single post type.

A further object of the invention is to provide a new and improved bearing assembly having novel means for alleviating the problem of inside diameter wall tolerance in the cylinders of car lifts.

Other objects, features and advantages of the invention will be readily apparent from the following description of a preferred embodiment thereof, taken in conjunction with the accompanying drawings, although variations and modifications may be effected without departing from the spirit and scope of the novel concepts embodied in the disclosure, and in which:

FIG. 4 is a fragmental isometric view of the combination bearing and stop assembly in association with the piston and cylinder and demonstrating an assembly procedure.

Figure 1:
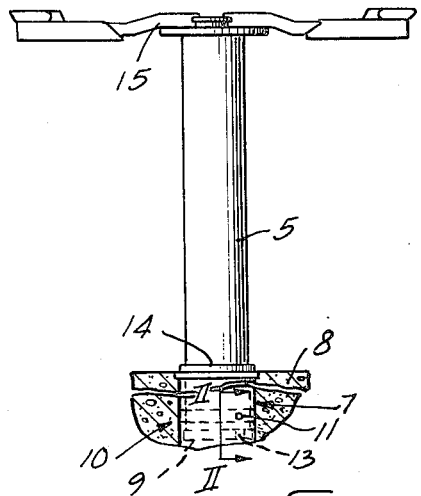
FIG. 1 is a fragmental side elevational view, partially in section, of a representative form of car lift with which the present invention is especially advantageous.

By way of illustration, a representative car lift (i.e. for automobiles, trucks, buses, etc.) is depicted in FIG. 1 comprising, as is customary, a lifting post plunger or piston 5 mounted for vertically reciprocal operation in a cylinder casing 7 supported in sunken relation within a rigidly supportive concrete floor slab 8. Upward limit of movement of the piston 5 within the cylinder 7 is controlled by means of laterally projecting stop means in the form of a ring 9 fixed to the lower end of the piston and dimensioned for clearance relative to the inside of the cylinder 7 which is generally not accurately finished and therefore contains variations in diameter throughout its length resulting from standard mill manufacturing tolerances. Vertical guidance means for the piston 5 include a combination stop and bearing assembly 10 which is mounted fixedly in the the cylinder 7 spaced about twice the piston diameter below the upper end of the cylinder and is held in place against axial displacement by means comprising a pair of stop studs 11 (FIGS. 1 and 4) which are desirably in the form of radially inwardly extending and aligned plugs mounted through respective holes 12 in the cylinder wall and within which the plugs are fixed and a hermetic seal effected as by welding. To facilitate passing of the piston end stop ring 9 past the studs 11 for assembling and disassembling purposes, such ring is provided with suitable clearance notches 13. After the cylinder-supported assembly 10 is mounted, it serves as a stop against which the stop ring 9 is engageable to limit upward or protractional displacement of the piston 5 within the cylinder 7 as effected in known manner by hydraulic pressure within the cylinder. This arrangement enables the piston 5 to be rotated freely in either direction.

As its upper end, the cylinder 7 carries a suitable packing gland structure 14 which not only prevents leakage of hydraulic fluid from within the cylinder but also serves as an upper bearing cooperating with the assembly 10 for maintaining the piston 5 substantially against swaying or lateral deflection in the protracted relationship of the piston.

On its upper end the piston 5 carries any preferred form of carsupporting superstructure 15.

Figure 2:
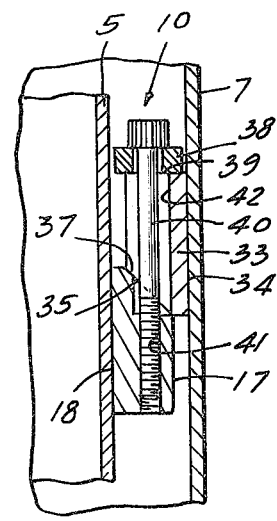
FIG. 2 is an enlarged fragmentary vertical sectional detail view taken substantially along the line II—II of FIG. 1.
Figure 3:
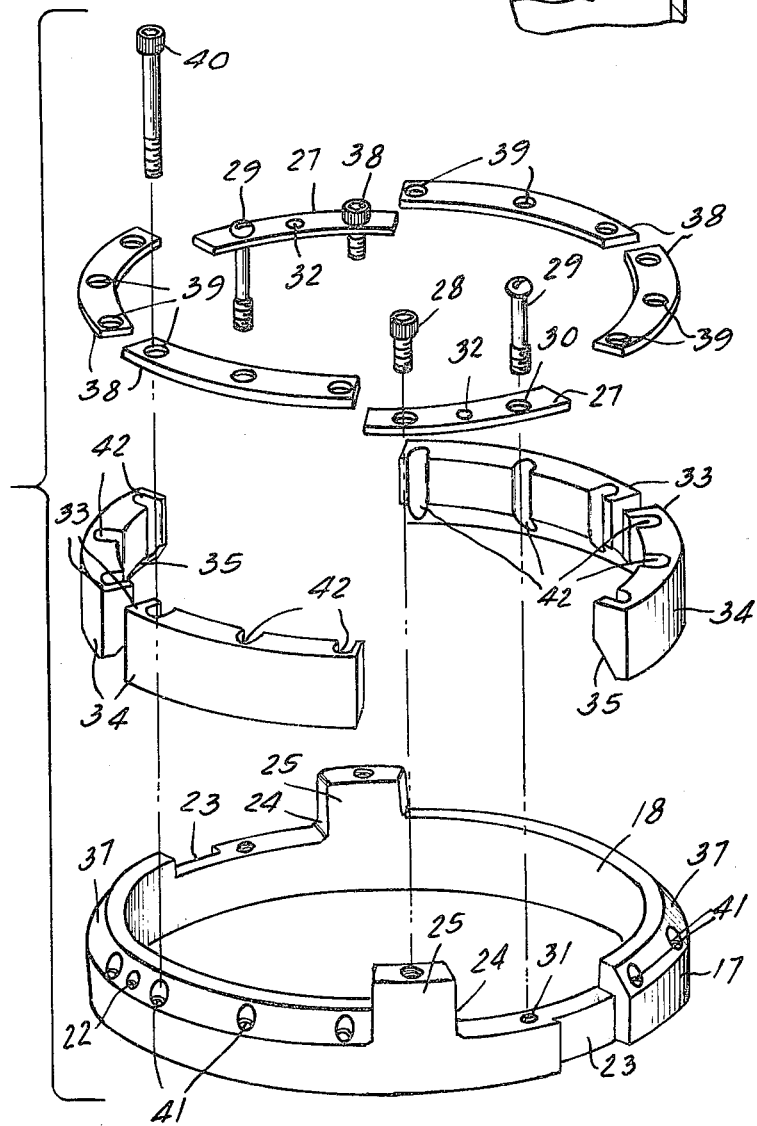
FIG. 3 is an exploded isometric view of a combination bearing and stop assembly embodying features of the invention.

According to the present invention, new and improved means are provided for mounting the assembly 10 in fixed concentric relation to and within the cylinder 7, irrespective of inside diameter tolerances in the cylinder, thereby eliminating or at least greatly minimizing wobble, swaying, lateral movement or displacement of the protracted, raised piston 5. To this end, the assembly 10 comprises a main bearing ring 17 (FIGS. 2, 3 and 4) which is of smaller outside diameter than the inside diameter of the cylinder 7 and has an inner annular bearing surface 18 of substantial length and finished to a close sliding bearing cooperation complementary to the outer perimeter bearing surface of the piston 5 which is finished to a close tolerance of concentricity throughout its bearing length.

Mounting of the bearing ring 17 on the studs 11 is adapted to be effected in the manner represented in FIG. 4 after the piston 5 has been mounted within the cylinder and with the packing 14 and the superstructure 15 removed. This leaves access into the space between the cylinder and the piston free at the top of the assembly so that the bearing ring 17 can be slipped over the upper end of the piston and down into the cylinder toward the stop studs 11. To assist in this maneuver, means comprising a pair of installation rods 19 (FIG. 4) are provided having upper end manipulating handles 20 and lower threaded ends 21 which are adapted to be screwed into respective tapped upwardly opening sockets 22 at diametrically opposite sides of the ring 17. Lowering of the bearing ring 17 is effected to the studs 11 which are cleared through respective diametrically opposite outer perimeter clearance notches 23 in the ring by axial movement of the bearing ring past the studs for registering the studs with respective circumferential interlock pockets 24 provided on the upper side of the bearing ring. In a desirable form, the pockets 24 are defined by respective upwardly extending integral ears 25 on the ring spaced circumferentially a limited distance from the notches 23 in excess of the diameter of the associated studs 11 and serving as stop shoulders limiting relative assembly movement of the studs into the pockets 24 by turning the bearing ring 17 by manipulation of the handle rods 19, indicated by the directional arrow in FIG. 4.

Completing the pockets 24 and enabling locking of the studs 11 therein, are means comprising respective segment plates 27 secured as by means of respective screws 28 to the upper ends of the ears 25 and over lying in cantilever fashion the pocket areas of the bearing ring to a length sufficiently greater than the diameter of the associated stud 11 so that a respective locking screws 29 can be driven down through a hole 30 in the plate 27 and secured fast in a tapped upwardly opening aligned screw socket 31 in the bearing ring 17. Thereby after the respective studs 11 have been received in the pockets 24, driving of the screws 29 home in their sockets 31 effectively locks the bearing ring against escape from the studs 11 which thereby efficiently retain the bearing ring against axial displacement. Since the studs 11 overlie the bearing ring, the ring serves efficiently in cooperation with the studs as a positive stop for the lower end bearing 9 of the piston. Very little downward thrust force against the bearing assembly will be experienced in service.

After installation of the bearing ring 17 has been accomplished, the handle rods 19 are removed. Should it become necessary to remove the bearing ring 17 the reverse procedure can be followed to that described for mounting the same. If it is preferred to remove the bearing ring 17 with the piston 5 for repair or servicing, that may be done by removing the pocket locking segments 27 by backing off the screws 28 and 29 and removing these segments by threadedly securing the threaded ends of the manipulating rods 19 into respective threaded holes 32 provided for this purpose in the segment plates. The bearing ring 17 and the piston-carried bearing 9 can then be readily maneuvered past the studs 11 by registering the clearance notches 23 and 13, respectively with the lugs and moving the bearings axially therepast.

To compensate for cylinder wall variables, wedging means are provided for maintaining the bearing ring 17 adjustably concentrically fixed within the cylinder. For this purpose a plurality, in this instance four, segmental wedge elements 33 are provided which are constructed and arranged to cooperate in balanced centering take-up relation to and between the bearing ring member 17 and the cylinder 7. In a preferred construction, each of the wedge segments 33 has a cylinder wall engaging circumferentially elongated friction surface 34 of substantial axial width formed on a segment of an arc complementary to the inner circumference of the cylinder 7. To effect a wedging cooperation with the bearing ring 17, each of the wedge segments 33 has on its radial inner side a generally axially downwardly and radially outwardly sloping cam surface 35 complementary to and wedgingly coactive with an annular cam surface 37 sloping axially downwardly and radially outwardly from the top edge of the bearing ring 17 to the outer perimeter of the ring between the pocket areas 24 and the ears 25.

Means are carried by the bearing ring 17 for applying adjustable wedging thrust to the wedge elements 33. For this purpose, respective segmental thrust plates 38 are provided which are complementary in length to the respective wedge elements and adapted to overlie the same in thrusting relation. Each of the thrust plates 38 is provided with a plurality, herein three equally spaced screw holes 39 through which thrust bolts 40 which may be of the Allen head type extend and are threadedly engaged in tapped axially extending screw holes 41 in the bearing ring 17. Clearance for the bolts 40 in the wedging segments 33 is provided by axially extending inner peripheral clearance notches 42 therein enabling free radial movement of the wedges when under wedging camming thrust by tightening the thrust plates 38 thereagainst. Through this arrangement, after the bearing ring 17 has been lowered into position and locked in place, with the centering wedges 33 riding loosely thereon, the socket head cap screw bolts are tightened evenly for effecting uniform frictional centering wedging engagement of the wedge surfaces 34 with the cylinder wall to effect a fixed centered relation of the bearing ring 17 rigidly within the cylinder for positive concentric guiding of the piston 5. Any eccentricities in the cylinder wall are readily compensated for by the ready adjustability in the wedging action of the plurality of segments 33. Access to the wedge bolts 40, as well as the other screws in the assembly, is readily gained through the open end of the space between the piston 5 and the cylinder 7 for manipulation by suitable long-handled screw drivers which may be on the order of the handle rods 19 but provided with suitable screw driver blade or socket wrench manipulating tip, as required.

By reason of the fixed concentricity of the bearing ring 17 as enabled by the properly adjusted centering wedges 33, and the axially spaced packing gland 14 support of the protracted lift piston 5 substantially free from wobble or lateral deflection is effectively accomplished.

It will be understood that variations and modifications may be effected without departing from the spirit and scope of the novel concepts of this invention.

We claim as our Invention:

1. In combination, a piston and a cylinder, said piston centered in and being of a smaller diameter than the cylinder:

a bearing member having a complete ring shaped bearing surface sized to the diameter of the piston and guidingly slidably engaged therewith;

means connecting said bearing member in fixed axial position in the cylinder;

centering take-up wedging means; and means attached to said bearing member and adjustably securing said wedging means in centering take-up relation to and between said bearing member and said cylinder.

2. A combination according to claim 1, wherein said bearing member has an outer perimeter annular cam surface, and said wedging means comprise a plurality of segmental wedge elements having cam surfaces at one of their ends complementary to and wedgingly engaging the annular cam surface and also having semicylindrical surfaces engaging the cylinder.

3. A combination according to claim 2, wherein said means for securing said wedge elements comprise thrust plate structure engaged with the elements on their opposite ends, and bolts securing said thrust plate structure to said member and selectively drawing the plates toward the member into thrusting relation against said wedge elements and thereby driving the wedge elements into said centering takeup relation.

4. A combination according to claim 1, wherein said bearing member has an annular cam surface sloping toward its outer perimeter, and said wedging means include segmental wedge elements having complementary cam surfaces.

5. A combination according to claim 4, wherein said securing means comprise thrust plates, and bolt means carried by the bearing member for driving said thrust plates against said elements and thus driving the elements into wedging engagement with the annular cam surface and the cylinder.

6. A combination according to claim 1, wherein said bearing member comprises a ring, said ring having a pocket for receiving a cylinder-carried stud.

7. In a combination according to claim 1, wherein the piston and cylinder are in a hydraulically operated single post car lift wherein the piston normally projects above the cylinder and is reciprocable between a substantially retracted relation and a substantially protracted relation to the cylinder, a packing gland at the upper end of the cylinder in engagement with the piston, stop means projecting from the lower end of the piston, said bearing member comprising a combination bearing and stop engageable by said stop means when the piston is in its protracted relation, said connecting means maintaining the bearing member within the cylinder spaced below the packing gland but substantially above said stop means when the cylinder is in the retracted relation.

8. A combination according to claim 7, wherein said bearing member comprises a ring having an annular cam surface sloping toward said cylinder, said wedging means comprising wedge structure engaging said cam surface, and said securing means being carried by the ring and thrusting said wedge structure along said cam surface and against the cylinder.

9. A combination according to claim 7, wherein said wedging means comprise a wedge element having a cam surface sloping toward the cylinder and facing toward and engaging the bearing member, and said securing means being carried by the bearing member and thrusting the wedge element toward and along said cam surface to drive the wedge element against the cylinder.

10. A combination according to claim 7, wherein said bearing member is a ring having an annular cam surface sloping toward the cylinder, said wedging means comprising a plurality of segmental wedge elements having cam surfaces complementary to said ring cam surface, and said securing means being carried by the ring and engaging and thrusting the elements wedgingly along said cam surface against the cylinder.

11. A combination according to claim 10, wherein said securing means comprise thrust plates and bolts secured to the bearing ring, and said wedge elements have clearance notches therein through which the bolts extend.

12. A combination according to claim 7, wherein said connecting means comprise retaining studs carried by and projecting into the cylinder, and means on the bearing member comprising interlocking structure releasably engaging said studs.

* * * * *